(12) United States Patent
Boyer et al.

(10) Patent No.: US 8,056,546 B2
(45) Date of Patent: Nov. 15, 2011

(54) MULTI-FUNCTION THROTTLE VALVE

(75) Inventors: Brad Boyer, Canton, MI (US); Neal J. Corey, Canton, MI (US); Daniel J. Styles, Canton, MI (US); James D. Ervin, Novi, MI (US); Sonny E. Stanley, Canton, MI (US); Matthew A. Younkins, Moon Township, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/730,616

(22) Filed: Mar. 24, 2010

(65) Prior Publication Data

US 2011/0132322 A1 Jun. 9, 2011

(51) Int. Cl.
*F02D 9/08* (2006.01)
*F02M 25/07* (2006.01)
*F02B 47/08* (2006.01)

(52) U.S. Cl. .................. 123/568.17; 123/337; 123/302; 123/308; 60/605.2

(58) Field of Classification Search .................. 123/337, 123/302, 306, 308, 568.12, 568.21, 568.17; 60/602, 605.2
See application file for complete search history.

(56) References Cited

U.S. PATENT DOCUMENTS

| | | | |
|---|---|---|---|
| 5,575,248 A | 11/1996 | Tada | |
| 5,749,335 A * | 5/1998 | Flanery et al. ................. | 123/337 |
| 6,073,600 A | 6/2000 | Ma | |
| 6,092,512 A | 7/2000 | Ma | |
| 6,131,554 A | 10/2000 | Ito et al. | |
| 6,148,794 A | 11/2000 | Tsuzuku et al. | |
| 6,289,883 B1 * | 9/2001 | Wakutani et al. ........ | 123/568.21 |
| 6,470,682 B2 | 10/2002 | Gray, Jr. | |
| 6,499,456 B1 | 12/2002 | Nogi et al. | |
| 6,742,495 B2 | 6/2004 | Ashida et al. | |
| 6,868,823 B2 * | 3/2005 | Sakai et al. ................... | 123/306 |
| 6,874,465 B2 * | 4/2005 | Arimatsu et al. ............. | 123/306 |
| 6,877,478 B2 * | 4/2005 | Kim et al. ..................... | 123/306 |
| 6,886,544 B1 * | 5/2005 | Bui .......................... | 123/568.18 |
| 6,918,372 B2 * | 7/2005 | Nishii et al. .................. | 123/306 |
| 6,923,156 B2 * | 8/2005 | Iwata et al. ................... | 123/336 |
| 6,948,483 B2 * | 9/2005 | Veinotte .................... | 123/568.18 |
| 7,028,680 B2 * | 4/2006 | Liu et al. .................. | 123/568.17 |
| 7,032,578 B2 * | 4/2006 | Liu et al. .................. | 123/568.15 |
| 7,036,493 B1 * | 5/2006 | Huebler et al. .......... | 123/568.17 |
| 7,051,702 B2 * | 5/2006 | Sakai et al. ................... | 123/308 |
| 7,077,099 B2 * | 7/2006 | Fujieda et al. ................ | 123/295 |
| 7,140,357 B2 * | 11/2006 | Wei et al. .................. | 123/568.17 |
| 7,159,393 B2 * | 1/2007 | Blomquist et al. .............. | 60/302 |
| 7,243,641 B2 * | 7/2007 | Zukouski ................. | 123/568.17 |
| 7,353,811 B2 * | 4/2008 | Weisz ...................... | 123/568.17 |
| 7,447,587 B2 * | 11/2008 | Baramov et al. .............. | 701/109 |
| 7,455,044 B2 * | 11/2008 | Isaji et al. ..................... | 123/308 |
| 7,552,722 B1 * | 6/2009 | Shieh et al. .............. | 123/568.17 |
| 7,568,464 B2 * | 8/2009 | Spegar .......................... | 123/306 |

(Continued)

*Primary Examiner* — Hai Huynh

(74) *Attorney, Agent, or Firm* — Julia Voutyras; Alleman Hall McCoy Russell & Tuttle LLP

(57) ABSTRACT

An engine system comprises an air cleaner, a combustion chamber coupled to an intake port, and an intake manifold. The intake manifold is configured to receive air from the air cleaner, and, under some conditions to receive exhaust from the combustion chamber. The engine system further comprises a multifunction, barrel-type throttle valve coupled to the intake port via an outlet, the throttle valve having a first inlet coupled to the intake manifold and a second inlet coupled to the air cleaner.

20 Claims, 10 Drawing Sheets

FIG. 8

U.S. PATENT DOCUMENTS

| | | | |
|---|---|---|---|
| 7,617,678 B2 * | 11/2009 | Joergl et al. | 60/605.2 |
| 7,637,244 B2 * | 12/2009 | Akazaki et al. | 123/337 |
| 7,757,660 B2 * | 7/2010 | Komiyama et al. | 123/337 |
| 7,802,555 B2 * | 9/2010 | Maeda | 123/306 |
| 7,805,926 B2 * | 10/2010 | Abi-Akar et al. | 60/278 |
| 2004/0177838 A1 * | 9/2004 | Veinotte | 123/568.17 |
| 2004/0237931 A1 * | 12/2004 | Okamoto et al. | 123/308 |
| 2005/0274354 A1 * | 12/2005 | Suzuki et al. | 123/302 |
| 2006/0102142 A1 * | 5/2006 | Holder et al. | 123/308 |
| 2006/0124116 A1 * | 6/2006 | Bui | 123/568.18 |
| 2006/0231067 A1 * | 10/2006 | Masuta et al. | 123/308 |
| 2007/0246009 A1 * | 10/2007 | Suzuki et al. | 123/336 |
| 2008/0190393 A1 * | 8/2008 | Miyanaga et al. | 123/188.7 |
| 2008/0283016 A1 | 11/2008 | Komiyama et al. | |
| 2009/0293838 A1 * | 12/2009 | Konakawa | 123/306 |
| 2010/0037873 A1 * | 2/2010 | Jung et al. | 123/568.21 |
| 2011/0036335 A1 * | 2/2011 | Wood et al. | 123/568.21 |
| 2011/0131975 A1 * | 6/2011 | Styles | 60/602 |

* cited by examiner

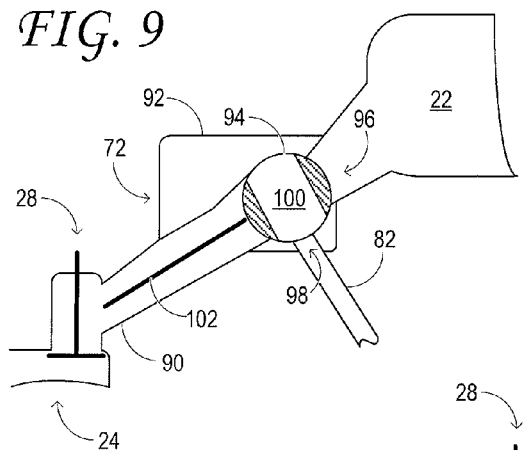
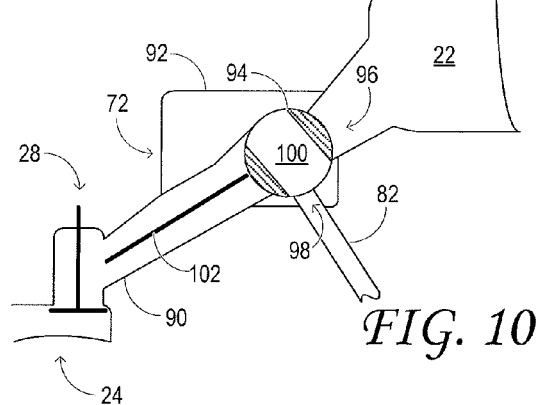
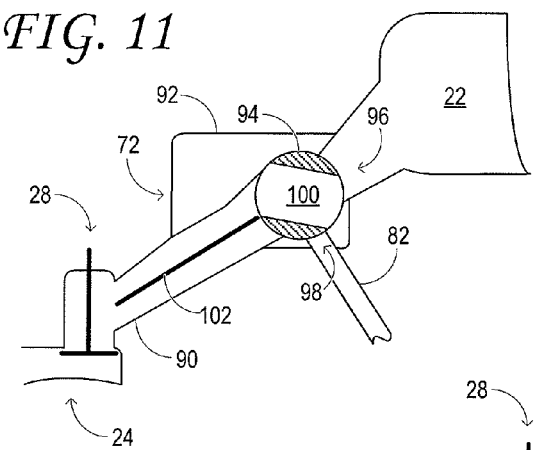
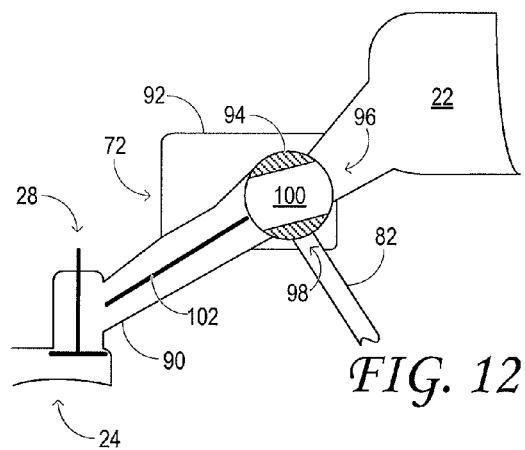

MULTI-FUNCTION THROTTLE VALVE

TECHNICAL FIELD

This application relates to the field of motor-vehicle engineering, and more particularly, to air induction and exhaust-gas recirculation in motor vehicle engine systems.

BACKGROUND AND SUMMARY

A boosted engine may exhibit higher combustion and exhaust temperatures than a naturally aspirated engine of similar output power. Such higher temperatures may cause increased nitrogen-oxide (NOX) emissions from the engine and may accelerate materials ageing, including exhaust-aftertreatment catalyst ageing. Exhaust-gas recirculation (EGR) is one approach for combating these effects. EGR works by diluting the intake air charge with exhaust gas, thereby reducing its oxygen content. When the resulting air-exhaust mixture is used in place of ordinary air to support combustion in the engine, lower combustion and exhaust temperatures result. EGR may also improve fuel economy in gasoline engines by reducing throttling losses and heat rejection.

In boosted engine systems equipped with a turbocharger compressor mechanically coupled to a turbine, exhaust gas may be recirculated through a high pressure (HP) EGR loop or through a low-pressure (LP) EGR loop. In the HP EGR loop, the exhaust gas is taken from upstream of the turbine and is mixed with the intake air downstream of the compressor. In an LP EGR loop, the exhaust gas is taken from downstream of the turbine and is mixed with the intake air upstream of the compressor.

HP and LP EGR strategies achieve optimum efficacy in different regions of the engine load-speed map. For example, on boosted gasoline engines running stoichiometric air-to-fuel ratios, HP EGR is desirable at low loads, where intake vacuum provides ample flow potential; LP EGR is desirable at higher loads, where the LP EGR loop provides the greater flow potential. Various other tradeoffs between the two strategies exist as well, both for gasoline and diesel engines. Moreover, each strategy presents its own control-system challenges. For example, HP EGR is most effective at low loads, where intake vacuum provides ample flow potential. At higher loads, it may be difficult to maintain the desired EGR flow rate. On the other hand, LP EGR provides adequate flow from mid to high engine loads, but may respond sluggishly to changing engine load, engine speed, or intake air flow. In gasoline engines especially, such unsatisfactory transient response may include combustion instability during TIP-out conditions, when fresh air is needed to sustain combustion but EGR-diluted air is present upstream of the throttle valve. Opening a compressor by-pass valve at this time provides a partial, but incomplete remedy for the problem, as EGR-diluted air remains upstream of the throttle, albeit at a lower absolute pressure. Moreover, a significant lag in EGR availability can occur during TIP-in conditions, as the amount of EGR accumulated in the intake manifold may not be sufficient to provide the desired combustion and/or emissions-control performance.

Various approaches have targeted transient control issues in engine systems equipped for EGR. For example, U.S. Pat. No. 6,470,682 to Gray, Jr. provides a base intake manifold through which fresh air and cooled LP EGR are provided to a diesel engine, and, an additional intake manifold that supplies only fresh air to the engine. The additional intake manifold is sourced by a fast-acting, electrically driven air compressor. When torque demand increases rapidly, the fast-acting compressor is switched on, displacing the existing mixture of air and EGR in the base intake manifold and providing increased oxygen mass to the engine, for increased torque. However, this system is particular to diesel engines, which may be unthrottled, and may tolerate significant amounts of EGR even at idle. Accordingly, the particular transient-control issues addressed in Gray, Jr. differ from those experienced in spark-ignition engines.

The inventors herein have recognized that improved transient control in an LP EGR equipped engine system can be achieved with the aid of a unique port-mounted throttle. In one embodiment, therefore, an engine system is provided. The engine system comprises an air cleaner, a combustion chamber coupled to an intake port, and an intake manifold. The intake manifold is configured to receive air from the air cleaner, and, under some conditions to receive exhaust from the combustion chamber. The engine system further comprises a multifunction, barrel-type throttle valve coupled to the intake port via an outlet, the throttle valve having a first inlet coupled to the intake manifold and a second inlet coupled to the air cleaner.

Among various other advantages, the throttle valve enables the engine system to rapidly switch between inducting an EGR-containing air charge from the intake manifold and inducting fresh air from the air cleaner. This approach effectively addresses at least some of the transient control difficulties of EGR-equipped engine systems.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of this disclosure will be better understood from reading the following detailed description of particular embodiments, with reference to the attached drawings, wherein:

FIGS. 9 and 10 schematically show a throttle barrel in a fresh-air inducting, high-tumble rotation in accordance with an embodiment of the present disclosure.

FIG. 11 schematically shows a throttle barrel in a mixture-inducting, high-tumble rotation in accordance with an embodiment of the present disclosure.

FIGS. 12 and 13 schematically show a throttle barrel in mixture-inducting, low tumble rotation in accordance with an embodiment of the present disclosure.

FIG. 14 schematically shows a throttle barrel having an eccentric barrel bore in accordance with an embodiment of the present disclosure.

DETAILED DESCRIPTION

The subject matter of this disclosure is now described by way of example and with reference to certain illustrated embodiments. Components that may be substantially the same in two or more embodiments are identified coordinately and are described with minimal repetition. It will be noted, however, that components identified coordinately in the different embodiments may be at least partly different. It will be further noted that the drawings included in this disclosure are schematic. Views of the illustrated embodiments are generally not drawn to scale; aspect ratios, feature size, and numbers of features may be purposely distorted to make selected features or relationships easier to see.

Figure 1:
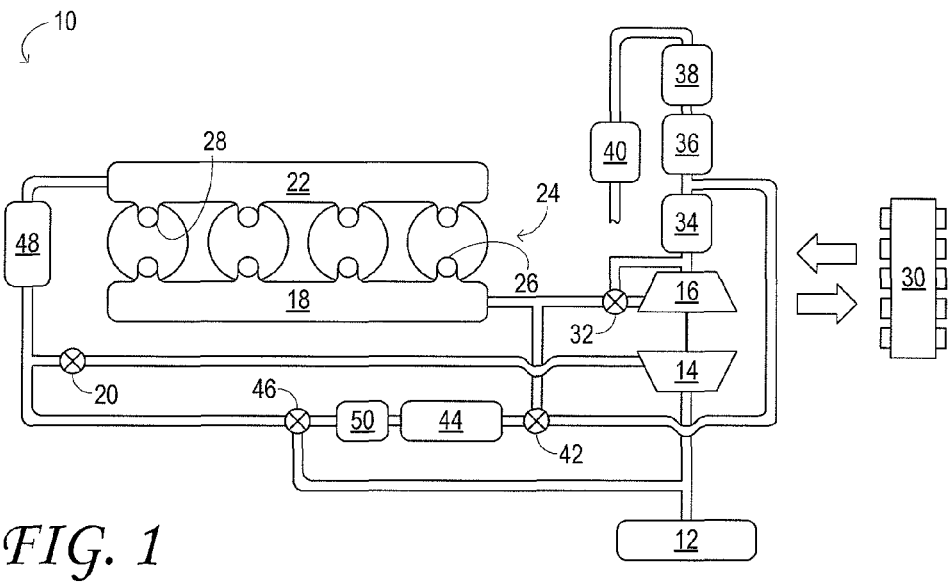
FIGS. 1 and 2 schematically show aspects of example engine systems in accordance with different embodiments of this disclosure.

FIG. 1 schematically shows aspects of an example engine system 10 in one embodiment. In engine system 10, fresh air is inducted via air cleaner 12 and flows to compressor 14. The compressor is a turbocharger compressor mechanically coupled to turbine 16, the turbine driven by expanding engine exhaust from exhaust manifold 18. In one embodiment, the compressor and turbine may be coupled within a twin scroll turbocharger. In another embodiment, the turbocharger may be a variable geometry turbocharger (VGT), where turbine geometry is actively varied as a function of engine speed. From the compressor, the pressurized air charge flows to throttle valve 20.

Exhaust manifold 18 and intake manifold 22 are coupled, respectively, to a series of combustion chambers 24 through a series of exhaust valves 26 and intake valves 28. In one embodiment, each of the exhaust and intake valves may be electronically actuated. In another embodiment, each of the exhaust and intake valves may be cam actuated. Whether electronically actuated or cam actuated, the timing of exhaust and intake valve opening and closure may be adjusted as needed for desirable combustion and emissions-control performance. In particular, the valve timing may be adjusted so that combustion is initiated when a substantial or increased amount of exhaust from a previous combustion is still present in one or more combustion chambers. Such adjusted valve timing may enable an 'internal EGR' mode useful for reducing peak combustion temperatures under selected operating conditions. In some embodiments, adjusted valve timing may be used in addition to the 'external EGR' modes described hereinafter. Via any suitable combination or coordination of internal and external EGR modes, the intake manifold may be adapted to receive exhaust from combustion chambers 24 under selected operating conditions.

FIG. 1 shows electronic control system 30, which may be any electronic control system of the vehicle in which engine system 10 is installed. In embodiments where at least one intake or exhaust valve is configured to open and close according to an adjustable timing, the adjustable timing may be controlled via the electronic control system to regulate an amount of exhaust present in a combustion chamber at the time of ignition. To assess operating conditions in connection with various control functions of the engine system, the electronic control system may be operatively coupled to a plurality of sensors arranged throughout the engine system—flow sensors, temperature sensors, pedal-position sensors, pressure sensors, etc.

In combustion chambers 24 combustion may be initiated via spark ignition and/or compression ignition in any variant. Further, the combustion chambers may be supplied any of a variety of fuels: gasoline, alcohols, diesel, biodiesel, compressed natural gas, etc. Fuel may be supplied to the combustion chambers via direct injection, port injection, throttle-body injection, or any combination thereof.

As noted above, exhaust from exhaust manifold 18 flows to turbine 16 to drive the turbine. When reduced turbine torque is desired, some exhaust may be directed instead through waste gate 32, by-passing the turbine. The combined flow from the turbine and the waste gate then flows through exhaust-aftertreatment devices 34, 36, and 38. The nature, number, and arrangement of the exhaust-aftertreatment devices may differ in the different embodiments of this disclosure. In general, the exhaust-aftertreatment devices may include at least one exhaust-aftertreatment catalyst configured to catalytically treat the exhaust flow, and thereby reduce an amount of one or more substances in the exhaust flow. For example, one exhaust-aftertreatment catalyst may be configured to trap NOX from the exhaust flow when the exhaust flow is lean, and to reduce the trapped NOX when the exhaust flow is rich. In other examples, an exhaust-aftertreatment catalyst may be configured to disproportionate NOX or to selectively reduce NOX with the aid of a reducing agent. In other examples, an exhaust-aftertreatment catalyst may be configured to oxidize residual hydrocarbons and/or carbon monoxide in the exhaust flow. Different exhaust-aftertreatment catalysts having any such functionality may be arranged in wash coats or elsewhere in the exhaust-aftertreatment devices, either separately or together. In some embodiments, the exhaust-aftertreatment devices may include a regenerable soot filter configured to trap and oxidize soot particles in the exhaust flow. Further, in one embodiment, exhaust-aftertreatment device 34 may comprise a light-off catalyst.

Continuing in FIG. 1, all or part of the treated exhaust from the exhaust aftertreatment devices may be released into the ambient via silencer 40. Depending on operating conditions, however, some treated exhaust may instead be diverted through two-way EGR selector valve 42, which is coupled upstream of high-temperature (HT) EGR cooler 44 in engine system 10. In one embodiment, the two-way EGR selector valve may be a two-state valve, which, in an first state, permits post-turbine exhaust gas to flow to the HT EGR cooler but blocks pre-turbine exhaust gas from flowing to the HT EGR cooler. In a second state, the two-way EGR selector valve blocks post-turbine exhaust gas from flowing to the HT EGR cooler but allows pre-turbine exhaust gas to flow to the HT EGR cooler. In one embodiment, the two-way EGR selector valve may be a diverter valve having a dual-bore butterfly structure. As shown in FIG. 1, exhaust manifold 18 is also coupled upstream of the HT EGR cooler. Accordingly, untreated, pre-turbine exhaust may be routed through the HT EGR cooler when two-way EGR selector valve 42 is in the second state, and when sufficient flow potential exists. In this manner, the two-way EGR selector valve functions as an EGR take-off selector, in the first state enabling treated LP exhaust to flow to the HT EGR cooler, and in the second state, enabling untreated HP exhaust to flow to the HT EGR cooler.

HT EGR cooler 44 may be any suitable heat exchanger configured to cool the selected exhaust flow for desired combustion and emissions-control performance. The HT EGR cooler may be cooled by engine coolant and configured to passively transfer heat thereto. Shared between the HP and LP EGR loops and sized to provide appropriate cooling for the LP EGR loop, the HT EGR cooler may be configured to cool the recirculated exhaust to temperatures acceptable for induction into compressor 14. However, because the HT EGR cooler circulates engine coolant, the risk of an EGR-containing air charge dropping below the water dewpoint temperature of the air charge is reduced. It will be noted that water droplets entrained in the intake air charge could potentially damage the impeller blades of the compressor if inducted therein.

From HT EGR cooler 44, the cooled exhaust flow is admitted to EGR control valve 46. In one embodiment, the EGR control valve may be a sliding-piston or linear-spool type valve actuated by an electric motor. Here, a substantially cylindrical piston may slide within a cylindrical valve body having appropriate seals. As such, the EGR control valve enables both flow selection and flow metering. In particular, the EGR control valve selectably routes the cooled exhaust flow to either of a downstream HP EGR mixing point or a downstream LP EGR mixing point. In the embodiment illustrated in FIG. 1, for example, the EGR control valve is configured to direct the cooled exhaust flow to integrated charge-air/EGR cooler 48 (an HP mixing point) or back to the inlet of compressor 14 (an LP mixing point). Further, the EGR control valve accurately meters the cooled EGR flow in the selected EGR loop. In one embodiment, the EGR control valve may be configured to stop routing engine exhaust through the HP EGR loop when adjusting the amount of engine exhaust flowing through the LP EGR loop, and, to stop routing engine exhaust through the LP EGR loop when adjusting the amount of engine exhaust flowing through the HP EGR loop. Positional feedback in the valve or in an associated valve actuator may enable closed-loop flow control in some embodiments.

Integrated charge-air/EGR cooler 48 may be any suitable heat exchanger configured to cool the compressed air charge to temperatures suitable for admission to intake manifold 22. In particular, it provides further cooling for the HP EGR loop. The integrated charge-air/EGR cooler may be configured to cool the exhaust to lower temperatures than HT EGR cooler 44, as condensation of water vapor in the HP EGR loop presents no particular risk. From the integrated charge-air/EGR cooler, the air charge flows to the intake manifold.

In the example configuration of FIG. 1, HP and LP EGR loops share a common flow path between two-way EGR selector valve 42 and EGR control valve 46. Therefore, a common flow sensor coupled within this flow path can provide EGR flow measurement for both loops. Accordingly, engine system 10 includes flow sensor 50 coupled downstream of HT EGR cooler 44 and upstream of EGR control valve 46. The flow sensor may comprise a hot wire anemometer, a delta pressure orifice, or a venturi, for example, operatively coupled to electronic control system 30.

In some embodiments, throttle valve 20, waste gate 32, two-way EGR selector valve 42, and EGR control valve 46 may be electronically controlled valves configured to close and open at the command of electronic control system 30. Further, one or more of these valves may be continuously adjustable. The electronic control system may be operatively coupled to each of the electronically controlled valves and configured to command their opening, closure, and/or adjustment as needed to enact any of the control functions described herein.

By appropriately controlling two-way EGR selector valve 42 and EGR control valve 46, and by adjusting the exhaust and intake valve timing (vide supra), electronic control system 30 may enable the engine system 10 to deliver intake air to combustion chambers 24 under varying operating conditions. These include conditions where EGR is omitted from the intake air or is provided internal to each combustion chamber (via adjusted valve timing, for example); conditions where EGR is drawn from a take-off point upstream of turbine 16 and delivered to a mixing point downstream of compressor 14 (HP EGR); and conditions where EGR is drawn from a take-off point downstream of the turbine and delivered to a mixing point upstream of the compressor (LP EGR).

It will be understood that no aspect of FIG. 1 is intended to be limiting. In particular, take-off and mixing points for HP and LP EGR may differ in embodiments fully consistent with the present disclosure. For example, while FIG. 1 shows LP EGR being drawn from downstream of exhaust-aftertreatment device 34, the LP EGR may in other embodiments be drawn from downstream of exhaust-aftertreatment device 38, or upstream of exhaust-aftertreatment device 34.

Figure 2:
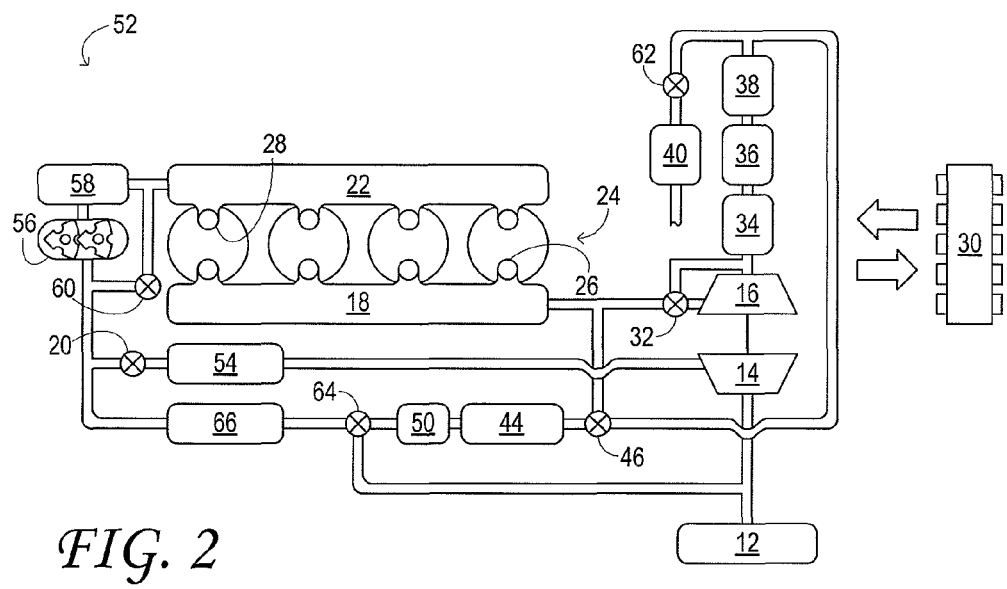

FIG. 2 schematically shows aspects of another example engine system 52 in one embodiment. In engine system 52, fresh air is inducted via air cleaner 12 and flows to first compressor 14. The first compressor may be a turbocharger compressor as described above. From the first compressor, intake air flows through first charge-air cooler 54 en route to throttle valve 20. From the throttle valve, the intake air enters second compressor 56, where it is further compressed. The second compressor may be any suitable intake-air compressor—a motor-driven or driveshaft driven supercharger compressor, for example. From the second compressor, the intake air flows through second charge-air cooler 58 en route to intake manifold 22. In the embodiment shown in FIG. 2, compressor by-pass valve 60 is coupled between the inlet of the second compressor and the outlet of the second charge-air cooler. The compressor by-pass valve may be a normally closed valve configured to open at the command of electronic control system 30 in order to relieve excess boost pressure of the second compressor under selected operating conditions. For example, the compressor by-pass valve may be opened during conditions of decreasing engine load to avert surge in the second compressor.

FIG. 2 shows exhaust back-pressure valve 62 and silencer 40 coupled downstream of exhaust-aftertreatment devices 34, 36, and 38. In one embodiment, the exhaust back-pressure valve may be a single-bore butterfly valve actuated by an electric motor. Positional feedback in the valve or in an associated valve actuator may enable closed-loop control in some embodiments. Continuing in FIG. 2, all or part of the treated exhaust from the exhaust aftertreatment devices flows through the exhaust back-pressure valve and is released into the ambient via the silencer. Depending on operating conditions, however, some treated exhaust may instead be diverted through EGR control valve 46. In one embodiment, the EGR control valve may be a sliding-piston or linear-spool type valve as described above.

Continuing in FIG. 2, EGR control valve 46 is configured to admit a selected exhaust flow to HT EGR cooler 44. Under certain operating conditions, the exhaust flow selected via EGR control valve 46 may comprise treated, post-turbine exhaust from downstream of exhaust aftertreatment device 38. Under other operating conditions, the selected exhaust flow may comprise untreated, pre-turbine exhaust from exhaust manifold 18. From the HT EGR cooler, the selected exhaust flow is admitted to EGR-directing valve 64. In one embodiment, the EGR-directing valve may be a single-shaft, dual-bore butterfly valve having blocking flaps offset ninety degrees with respect to each other. This pressure-balanced valve allows for the selected exhaust flow to be directed in either of two directions: to an HP mixing point downstream of first compressor 14 or to an LP mixing point upstream of the first compressor. In the embodiment shown in FIG. 2, the EGR-directing valve is configured to direct the cooled, selected exhaust flow to low-temperature (LT) EGR cooler 66 (an HP mixing point) or back to the inlet of first compressor 14 (an LP mixing point).

LT EGR cooler 66 may be any heat exchanger configured to cool the selected exhaust flow to temperatures suitable for mixing into the intake air. In particular, the LT EGR cooler provides further cooling for the HP EGR loop. Accordingly, the LT EGR cooler may be configured to cool the exhaust to lower temperatures than HT EGR cooler 44, as condensation of water vapor in the HP EGR loop presents no particular risk. From the LT EGR cooler, the selected exhaust flow is mixed in with the compressed intake air flowing from throttle valve 20 and is delivered to second compressor 56.

Though differing in their detailed configurations, the embodiments shown in FIGS. 1 and 2 both include a first conduit network (viz., an HP EGR loop) configured to route some engine exhaust from a take-off point downstream of the turbine to a mixing point upstream of the compressor, and, a second conduit network (viz., an HP EGR loop) configured to route some engine exhaust from a take-off point upstream of the turbine to a mixing point downstream of the compressor. Further both embodiments include at least one shared conduit and a control valve coupled in the shared conduit. The control valve is configured to adjust an amount of engine exhaust flowing through the first conduit network and to adjust an amount of engine exhaust flowing through the second conduit network.

In the example configuration shown in FIG. 2, HP and LP EGR loops share a common flow path between EGR control valve 46 and EGR-directing valve 64. Therefore, a common flow sensor 50 coupled within this flow path can provide EGR flow measurement for both loops, substantially as described above.

Like throttle valve 20, waste gate 32, and EGR control valve 46, compressor by-pass valve 60, exhaust back-pressure valve 62, and/or EGR-directing valve 64 may be electronically controlled valves configured to close and open at the command of electronic control system 30. Further, one or more of these valves may be continuously adjustable. The electronic control system may be operatively coupled to each of the electronically controlled valves and configured to command their opening, closure, and/or adjustment as needed to enact any of the control functions described herein.

By appropriately controlling EGR control valve 46 and EGR-directing valve 64, and by adjusting the exhaust and intake valve timing, electronic control system 30 may enable the engine system 10 to deliver intake air to combustion chambers 24 under varying operating conditions, including conditions of no EGR, internal EGR, HP EGR or LP EGR, substantially as described above.

Enabling multiple EGR modes in an engine system provides several advantages. For instance, cooled LP EGR may be used for low-speed operation. Here, EGR flow through first compressor 14 moves the operating point away from the surge line. Turbine power is preserved, as the EGR is drawn downstream of the turbine. On the other hand, cooled HP EGR may be used for mid-to-high speed operation. Under such conditions, where waste gate 32 may be partially open, drawing EGR upstream of the turbine will not degrade turbocharger performance. Further, as no EGR is drawn through the first compressor at this time, the operating margin between choke and overspeed lines may be preserved.

Figure 3:
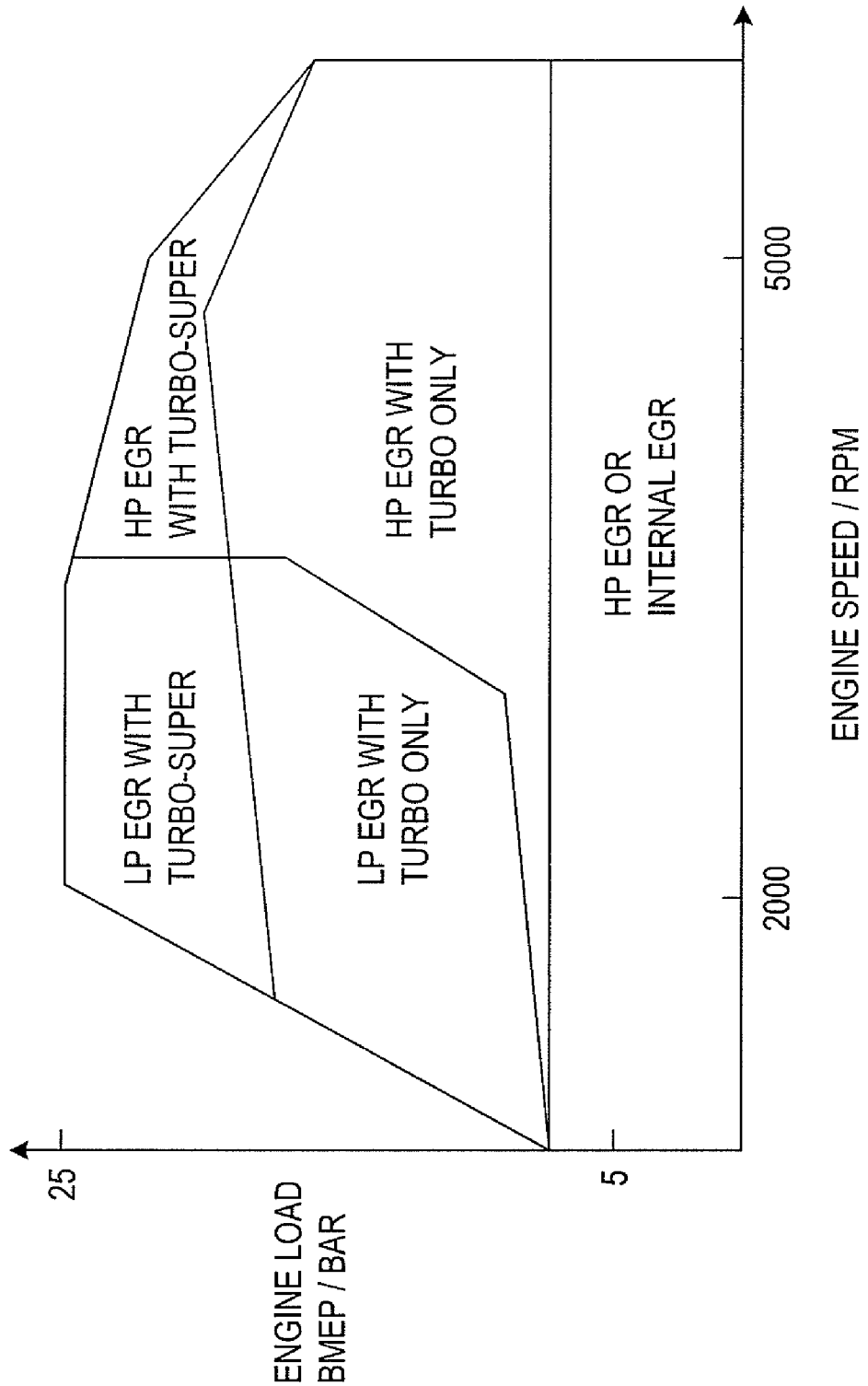
FIG. 3 shows an idealized map of engine load versus engine speed for a supercharged and turbocharged gasoline engine in accordance with an embodiment of the present disclosure.

Further advantages may be realized in configurations such as engine system 52, which include a first (turbocharger) compressor 14 and a second (supercharger) compressor 56. Such a system admits of various modes of interoperability between the compressors and the HP and LP EGR loops. One example mode of interoperability is illustrated in FIG. 3, which shows a graph of engine load versus engine speed. The graph is divided into three engine-load regions: a low-load region where little or no boost is provided by either compressor and where HP EGR or internal EGR may be used for desired combustion properties, a mid-load region where boost is provided via the turbocharger compressor alone, and a high-load region where boost is provided via the turbocharger compressor and via the supercharger compressor. The mid-load region and the high load region are each divided into a lower engine-speed region and a higher engine-speed region. In each case, LP EGR is used in the lower engine-speed region, and HP EGR is used in the higher engine-speed region. Accordingly, the ability to switch between HP and LP EGR in engine systems such as the one illustrated enables more effective control of EGR amounts in the various engine speed/load regions.

Still further advantages accrue from the sharing—i.e., double use—of at least some components between HP and LP EGR loops. In the embodiments shown in FIGS. 1 and 2, shared components include HT EGR cooler 44, EGR flow sensor 50, EGR selection and control valves, and the section of conduit running therebetween. By configuring these components to be shared instead of redundant, a significant savings in the cost and weight of the engine system may be realized. Further, the shared configuration may result in significantly less crowding in the engine system, as compared to configurations in which all EGR components are provided redundantly. Moreover, closed-loop control of EGR dosing may be simplified in engine systems 10 and 52, for example, where only a single sensor need be interrogated to measure the EGR flow rate for both HP and LP EGR loops.

To illustrate yet another advantage, it will be noted that engine systems 10 and 52, and electronic control system 30, may be further configured for additional operating conditions, where EGR is provided via any suitable combination or admixture of the modes described herein. For example, by appropriate positioning of EGR control valve 46 and one of two-way EGR selector valve 42 and EGR-directing valve 64, recirculated exhaust may be routed from an HP take-off point to an LP mixing point. This strategy may be desirable under some operating conditions—to avoid surge in first compressor 14 or to enhance EGR flow, for example.

Figure 4:
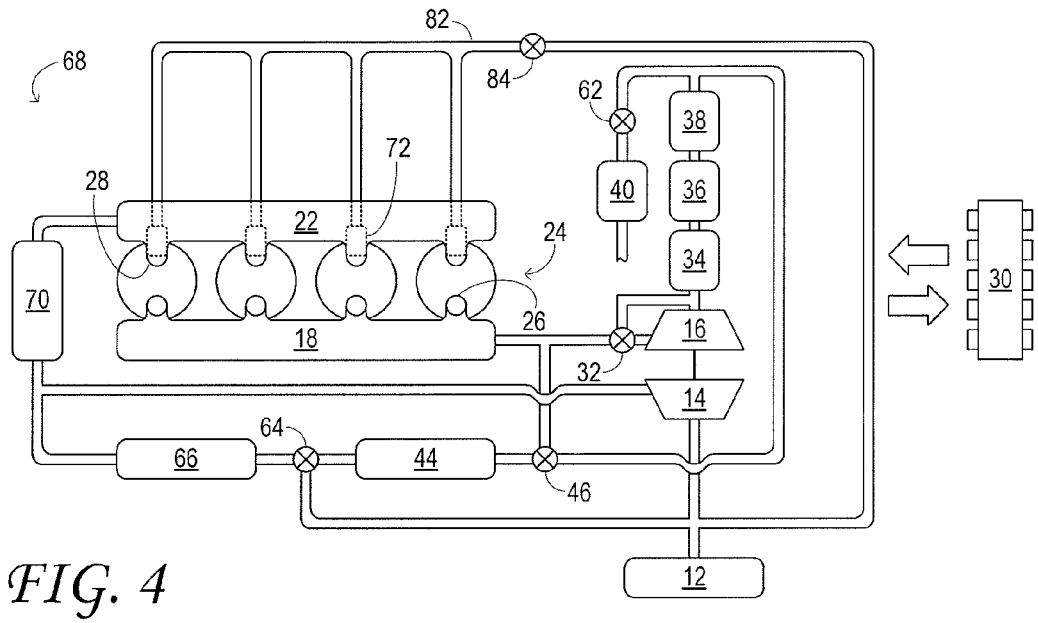
FIG. 4 schematically shows aspects of another engine system in accordance with an embodiment of the present disclosure.

FIG. 4 schematically shows aspects of another example engine system 68 in one embodiment. In engine system 68, fresh air is inducted via air cleaner 12 and flows to compressor 14. In the embodiment shown in FIG. 4, the compressor is a turbocharger compressor mechanically coupled to turbine 16, as described above. From the compressor, intake air flows through charge-air cooler 70 en route to intake manifold 22. The charge-air cooler may be any suitable heat exchanger configured to cool the compressed intake air charge for suitable combustion and emissions-control performance. Coupled to the intake manifold are one or more port-type throttle valves 72, which provide air-flow restriction and other functions, as further described below.

FIG. 4 shows exhaust back-pressure valve 62 and silencer 40 coupled downstream of exhaust-aftertreatment devices 34, 36, and 38. Accordingly, all or part of the treated exhaust from the exhaust aftertreatment devices flows through the exhaust back-pressure valve and is released into the ambient via the silencer. Depending on operating conditions, however, some treated exhaust may be diverted through EGR control valve 46. The EGR control valve is configured to admit a selected exhaust flow to HT EGR cooler 44, as described above.

Under certain operating conditions, the exhaust flow selected via EGR control valve 46 may comprise treated, post-turbine exhaust from downstream of exhaust aftertreatment device 38. Under other operating conditions, the selected exhaust flow may comprise untreated, pre-turbine exhaust from exhaust manifold 18. From HT EGR cooler 44, the selected exhaust flow is admitted to EGR directing valve 64. The EGR directing valve is configured to direct the cooled, selected exhaust flow in one of two directions: to LT EGR cooler 66 or back to the inlet of compressor 14. From the LT EGR cooler, the doubly cooled, selected exhaust flow is mixed in with the compressed intake air flowing to charge-air cooler 70.

In some embodiments, throttle valves 72, like various other valves identified herein, may be electronically controlled valves configured to close and open at the command of electronic control system 30. Further, one or more of these valves may be continuously adjustable. The electronic control system may be operatively coupled to each of the electronically controlled valves and configured to command their opening, closure, and/or adjustment as needed to enact any of the control functions described herein.

It will be understood that no aspect of FIG. 4 is intended to be limiting. For example, in other embodiments fully consistent with this disclosure, different engine-system configurations besides the one shown above may provide cooled LP and HP EGR. For example, LP EGR may be routed through an EGR conduit, EGR control valve, and EGR cooler entirely distinct from those used in the HP EGR path, in contrast to the embodiments shown in FIGS. 1 and 2.

Figure 5:
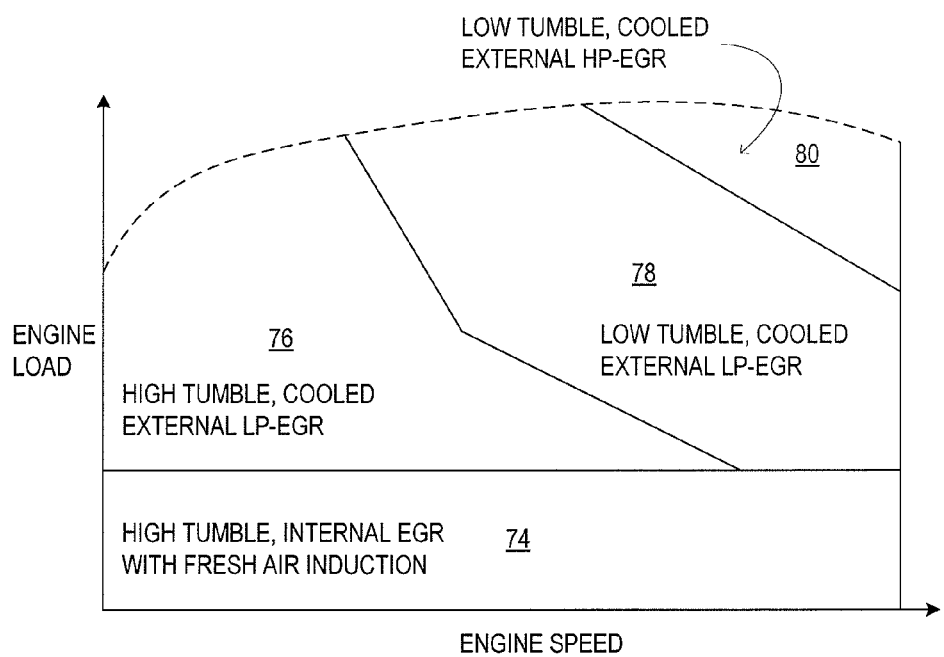
FIG. 5 shows an idealized map of engine load versus engine speed for a turbocharged gasoline engine in accordance with another embodiment of the present disclosure.

Enabling multiple EGR modes in engine system 68 provides several advantages, as noted above. Still greater advantages accrue when fresh air and/or EGR are provided to combustion chambers 24 with an appropriate degree of 'tumble,' i.e., convection off the flow axis. As shown in FIG. 5, the appropriate degree of tumble, as well as the appropriate EGR mode, may differ for different operating conditions of engine system 68. FIG. 5 shows an idealized map of engine load versus engine speed for an example gasoline engine. The graph is divided into four regions. Region 74 is a low-load region, in which no external EGR is delivered to the combustion chambers. In this region, adjusted valve timing may be used to provide internal EGR; throttle valves 72 admit only air to combustion chambers 24, and a relatively high degree of tumble may be desired. Region 76 is a high-load, low-speed region, where cooled LP EGR is delivered to the combustion chambers, and where a relatively high degree of tumble may be desired. Region 78 is a high-load, mid-speed region, where cooled LP EGR is delivered to the combustion chambers, but a relatively low degree of tumble may be desired. Region 80 is a high-load, high-speed region, where cooled HP EGR is delivered to the combustion chambers, and where a relatively low degree of tumble may be desired.

Despite the advantages noted above, an EGR system may be prone to transient-control difficulties when the operating point of the engine changes rapidly. Such changes include so-called 'TIP-out', where engine load suddenly decreases. With reference to FIG. 5, a TIP-out may correspond to a relatively rapid transition from region 78 to region 74, for example. When TIP-out occurs, inducted EGR may cause combustion instability; it may be desired, therefore, that intake air containing EGR be promptly blocked from entering combustion chambers 24 during TIP-out, and that fresh air be delivered to the combustion chambers instead. Accordingly, in the embodiment illustrated in FIG. 4, throttle valves 72 are configured, under certain operating conditions, to admit fresh air from air cleaner 12 to the combustion chambers, and under other operating conditions to admit whatever air charge may be present in intake manifold 22. Depending on the current operating state of engine system 68, the air charge present in the intake manifold may be compressed and/or diluted with EGR. Embodiments are further contemplated in which the throttle valves are configured to admit to the combustion chambers a selected mixture of fresh air and whatever air charge may be present in the intake manifold.

To enable such functionality, each throttle valve in engine system 68 may be a multifunction, barrel-type throttle valve coupled to an intake port of the engine via an outlet. Each throttle valve may have a first inlet coupled to a first air source, such as the intake manifold, and a second inlet coupled to a second air source, such as the air cleaner. Accordingly, the embodiment illustrated in FIG. 4 includes fresh-air line 82, coupled to each throttle valve 72 and to air cleaner 12. The fresh-air line supplies fresh air to the throttle valves. As further described below, each throttle valve may be configured to select between the fresh air and the mixture present in the intake manifold, and to provide the same with an appropriate degree of tumble.

FIG. 4 also shows optional idle control valve 84. The idle control valve may be configured to provide greater control of the weak air flow needed to sustain idle in engine system 68. Other embodiments may include a separate idle control valve for each throttle valve 72. In still other embodiments, throttle valves 72 may themselves provide adequate control of air induction during idle; in such embodiments, idle control valve 84 may be omitted.

Figure 6:
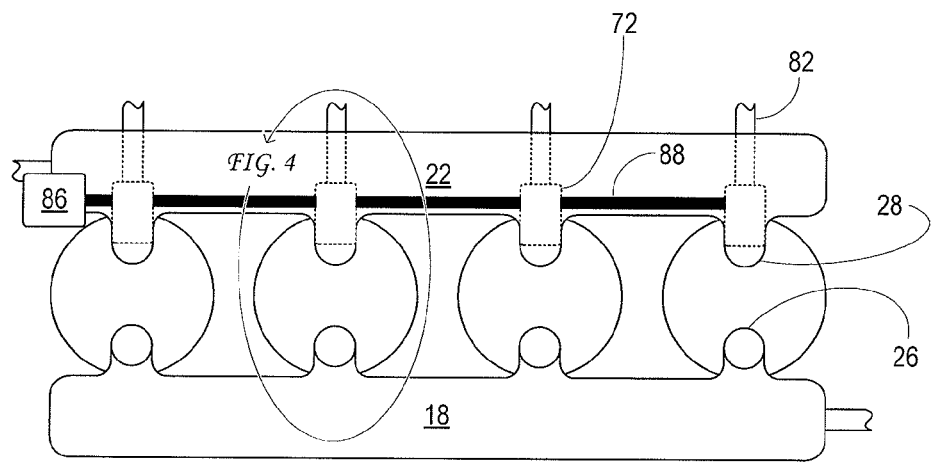
FIG. 6 schematically shows a more detailed schematic view of some aspects of the engine system schematically shown in FIG. 4 in accordance with an embodiment of the present disclosure.

FIG. 6 provides a more detailed schematic view of some aspects of engine system 68. In particular, the drawing shows throttle-valve actuator 86 mechanically coupled to actuator shaft 88. The throttle-valve actuator may be any suitable rotational actuator. In one embodiment, the throttle-valve actuator may include a servo motor, and may be controlled via electronic control system 30. The actuator shaft may be configured in any manner whatsoever to transmit the rotational motion of the throttle-valve actuator to throttle valves 72, and thereby control the throttle valves. Aspects of each throttle valve that may be controlled in this manner include an opening amount with respect to fresh air, an opening amount with respect to the air charge from intake manifold 22, and a degree of tumble at which the fresh air and/or intake-manifold air charge is provided to its respective intake valve 28. In one embodiment, the actuator shaft may extend through and be mechanically coupled to a rotatable part of each throttle valve. In one embodiment, the rotatable part of the throttle valve may comprise a throttle barrel, as further described below.

It will be understood that no aspect of FIG. 6 is intended to be limiting. Although FIG. 6 depicts a four-cylinder, in-line engine, the present disclosure is equally applicable to engines having more or fewer cylinders, and to V-type engines in which opposing banks of cylinders are arranged on either side of the engine. In embodiments that include a V-type engine, a pair of actuator shafts may be used to transmit rotational motion to throttle valves 72. And, in some such embodiments, each of the actuator shafts may be driven by a separate throttle-valve actuator.

Figure 7:
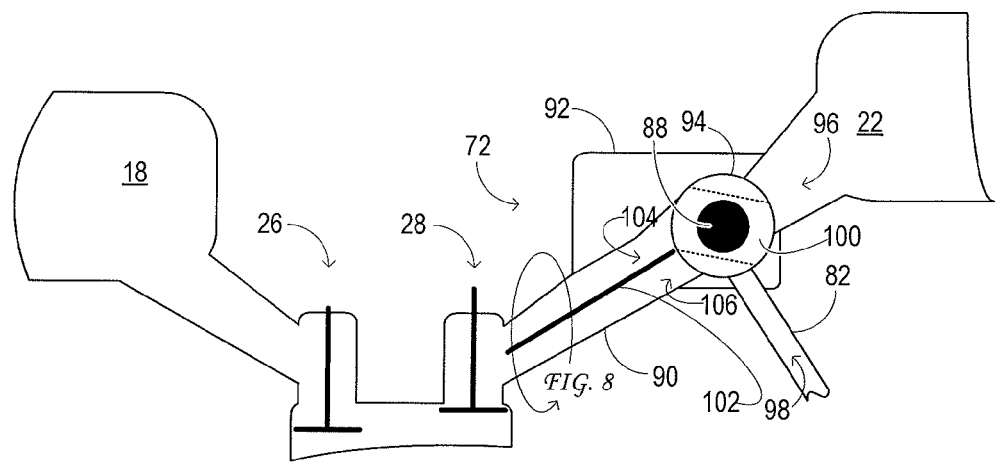
FIG. 7 schematically shows an even more detailed schematic view of some aspects of the engine system schematically shown in FIG. 4 in accordance with an embodiment of the present disclosure.

FIG. 7 provides an even more detailed schematic view of some aspects of engine system 68 in one embodiment. In particular, the drawing shows a region from FIG. 6 expanded and rotated. FIG. 7 shows throttle valve 72 in cross section. The throttle valve is coupled to intake port 90 of the engine. The intake port has an upstream end and a downstream end. The downstream end of the intake port is coupled to combustion chamber 24 via intake valve 28.

Throttle valve 72 includes throttle body 92 and throttle barrel 94. As noted above, the throttle barrel may be mechanically coupled to actuator shaft 88. Accordingly, throttle-valve actuator 86 may be configured to adjust and control an angle of rotation of the throttle barrel with respect to the throttle body, thereby controlling the throttle valve with respect to the functions identified herein.

Throttle body 92 has an outlet configured to couple to the upstream end of intake port 90, a first inlet 96 coupled to intake manifold 22, and a second inlet 98 coupled to fresh-air line 82. The throttle barrel is rotatably coupled into the throttle body and includes barrel bore 100. The barrel bore aligns with the first inlet at a first rotation of the throttle barrel, with the second inlet at a second rotation of the throttle barrel, and with the outlet at the first and second rotations of the throttle barrel, as further described below. Naturally, the first and second rotations of the throttle barrel, and other rotations referred to herein, may be among a plurality of discrete or substantially continuous rotations of the throttle barrel within the throttle body. Such rotations may be dialed through by appropriate control of throttle-valve actuator 86, to bring about corresponding discrete or substantially continuous changes in the flow of fresh air and/or EGR to intake port 90, and, to bring about corresponding discrete or substantially continuous changes in the degree of tumble at which the flow is delivered.

In some embodiments, one or both of throttle body 92 and throttle barrel 94 may comprise a non-stick, wear-resistant material capable of forming a leak-resistant seal. Suitable non-stick materials include diamond-like silicon, metallic glass, and various fluorinated polymers, such as polytetrafluroethylene (PTFE). In one embodiment, a non-stick material may be applied a coating on the throttle body. In other embodiments, it may be applied as a coating on the throttle barrel.

As shown in FIG. 7, intake port 90 includes partition 102 arranged inside a conduit. The partition is configured to segregate two complementary flow areas of the conduit—first flow area 104 and second flow area 106—and to guide the air flow through each segregated flow area to intake valve 28. In the embodiment illustrated in FIG. 7, the partition extends substantially all the way from the intake valve to the throttle barrel.

Extending across the outlet of throttle valve 72, partition 102 divides the outlet into complementary first and second zones—cross sections of first flow area 104 and second flow area 106. The partition is slidably sealed against the throttle barrel 94 such that barrel bore 100 aligns with the first zone at a third rotation of the throttle barrel and with the first and second zones at a fourth rotation of the throttle barrel, as further described below. The illustrated configuration provides that a significant degree of tumble may be imparted to the air inducted into combustion chamber 24 under selected operating conditions—by allowing flow through the first flow area and blocking flow through the second flow area, for example. The illustrated configuration also provides that the inducted air may be delivered to the combustion chamber with significantly less tumble—by allowing flow through the first and second flow areas simultaneously. Accordingly, electronic control system 30 may be configured to control whether the outlet of the throttle valve communicates with one or both of the first and second flow areas by commanding rotation of valve actuator 86.

Figure 8:
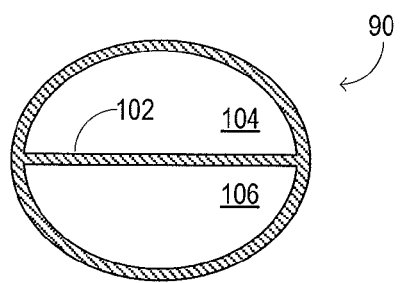
FIG. 8 schematically shows a region from FIG. 7 expanded and rotated.

FIG. 8 shows a region from FIG. 7 expanded and rotated. As shown in FIG. 8, partition 102 cross-sectionally divides intake port 90 in two zones corresponding to first flow area 104 and second flow area 106. Accordingly, the flow of the intake-charge through the intake port is divided in two.

FIGS. 9-13 show another region from FIG. 7 and provide additional cross-sectional views of throttle valve 72. In particular, FIGS. 9-13 show barrel bore 100, first inlet 96, and second inlet 98 in one example embodiment. In the illustrated embodiment, the first inlet and the second inlet are formed in throttle body 92 and extend substantially all the way to throttle barrel 94. With respect to the symmetry axis of the throttle barrel, the first inlet is arranged opposite partition 102, and the second inlet is arranged at right angles to the partition and the first inlet. The first inlet, the barrel bore, and the intake port are substantially equal in cross-sectional area, while the second inlet has a smaller cross-sectional area. By rotation of the throttle barrel, the barrel bore may be positioned in various ways with respect to the first inlet and the second inlet, as further described below. In particular, the barrel bore may be configured to couple an upstream end of intake port 90 to intake manifold 22 at a first rotation of the throttle barrel, and to couple the upstream end of the intake port to air cleaner 12 at a second rotation of the throttle barrel. Further, the throttle barrel may be slidably sealed against the partition such that the barrel bore communicates with the first flow area at a third rotation of the throttle barrel and with the first and second flow areas at a fourth rotation of the throttle barrel.

FIGS. 9 and 10 show throttle barrel 94 in fresh-air inducting, high-tumble rotations. In FIG. 9, barrel bore 100 is closed to first inlet 96, open to second inlet 98, and only slightly open to intake port 90. This condition corresponds to region 74 of FIG. 5. In particular, it corresponds to an idle condition. FIG. 10 shows throttle barrel 94 in a similar orientation, but rotated slightly counterclockwise. This condition also corresponds to region 74, somewhat removed from idle by application of a small engine load.

FIG. 11 shows throttle barrel 94 in a mixture-inducting, high-tumble rotation. Barrel bore 100 is open to first inlet 96, closed to second inlet 98, and partly open to intake port 90. In particular, the barrel bore opens to only one of the two flow areas of the intake port separated by partition 102. As a result, intake air flow will be provided to combustion chamber 24 through one flow area of the intake port only, providing a relatively high degree of tumble. This condition corresponds to region 76 in FIG. 5.

Figures 13, 14:
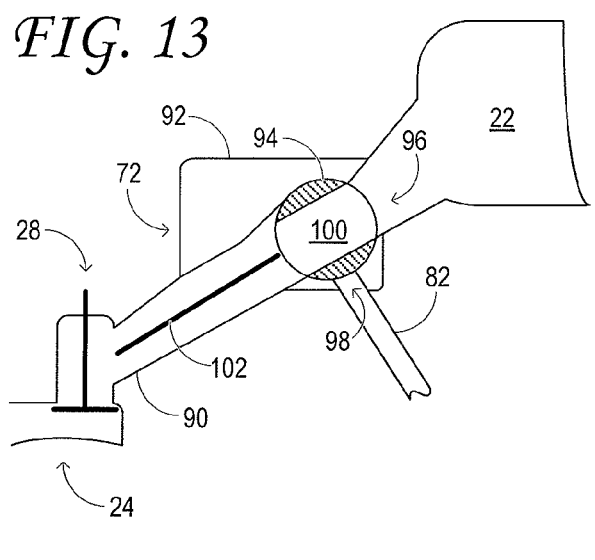

FIGS. 12 and 13 show throttle barrel 94 in mixture-inducting, low tumble rotations, where barrel bore 100 is open to first inlet 96, closed to second inlet 98, and open to intake port 90. In FIG. 12, barrel bore 100 is partially open to the first inlet, and in FIG. 13, the barrel bore is fully open to the first inlet. In both drawings, the barrel bore opens to both of the two flow areas of the intake port separated by partition 102. As a result, intake air flow will be provided to combustion chamber 24 through both flow areas of the intake port, providing a relatively low degree of tumble. These rotational states of the throttle barrel may correspond to regions 78 or region 80 of FIG. 5, depending on the way in which external EGR is delivered in engine system 68. With continued reference to FIG. 4, if EGR control valve 46 is in a position to select a post-turbine exhaust flow and EGR directing valve 64 is in a position to direct the exhaust flow to the inlet of turbine 14, (cooled LP EGR), then the throttle barrel rotation shown in FIGS. 12 and 13 will correspond to region 78. However, if the EGR control valve is in a position to select a pre-turbine exhaust flow and the EGR directing valve is in a position to direct the exhaust flow to LT EGR cooler 52 (cooled HP EGR), then the throttle barrel rotation shown in FIGS. 12 and 13 will correspond to region 80.

Further advantages of engine system 68 will be apparent from examining FIGS. 9-13 in greater detail. For example, a TIP-out situation corresponds to an abrupt transition from region 78 to region 74. In the embodiments illustrated herein, the required throttle adjustment would be from the rotational state shown in FIG. 12 or 13 to the rotational state shown in FIG. 9. This adjustment of one quarter clockwise turn or less can be enacted promptly, resulting in a prompt transition from compressed, EGR-diluted air to fresh air being supplied to combustion chambers 24.

FIGS. 4-13 and description hereinabove have detailed only some embodiments of the present disclosure; numerous other embodiments are contemplated as well. One such embodiment includes a throttle valve having dual throttle barrels—one throttle barrel for controlling air from the intake manifold, and a second throttle barrel for admitting fresh air. In one embodiment, the dual throttle barrels may be actuated by a common actuator shaft. FIG. 14 shows aspects of yet another embodiment, where the barrel bore is arranged eccentrically with respect to the throttle barrel. Moving the barrel bore out of the plane of symmetry of the throttle barrel may enable more facile adjustment of the amount of manifold air and fresh air inducted into the combustion chambers under certain operating conditions. In addition, the various throttle-valve embodiments disclosed herein may be fashioned as a retrofit for various existing port throttle valves.

The configurations illustrated above enable various methods for routing intake air to a combustion chamber of an engine. Accordingly, some such methods are now described, by way of example, with continued reference to above configurations. It will be understood, however, that these methods, and others fully within the scope of this disclosure, may be enabled via other configurations as well.

The methods presented herein include various computation, comparison, and decision-making actions, which may be enacted via an electronic control system (e.g., electronic control system 30) of the illustrated engine systems or of a vehicle in which such an engine system is installed. The methods also include various measuring and/or sensing actions that may be enacted via one or more sensors disposed in the engine system (temperature sensors, pedal-position sensors, pressure sensors, etc.) operatively coupled to the electronic control system. The methods further include various valve-actuating events, which the electronic control system may enact in response to the various decision-making actions.

Figure 15:
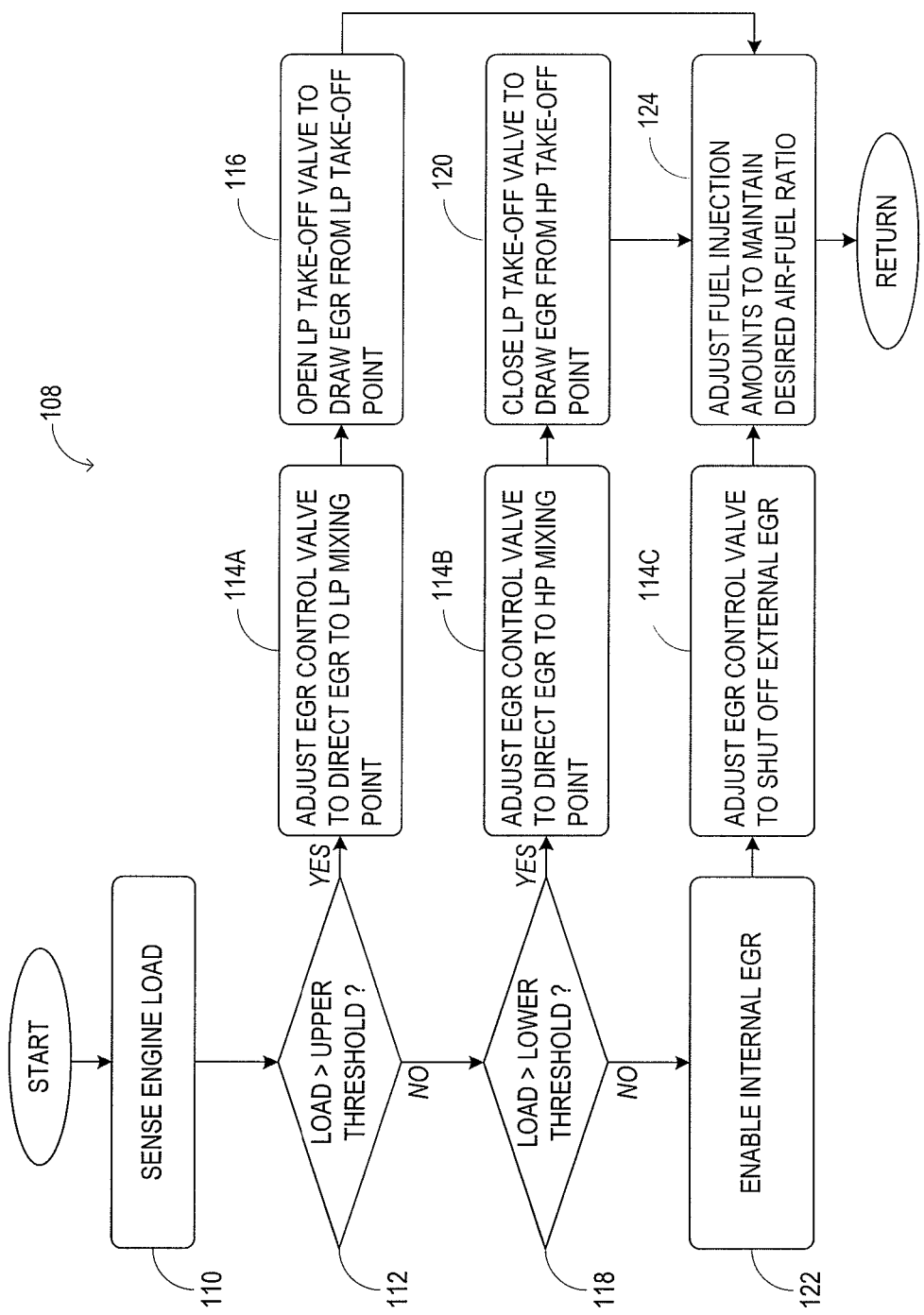
FIGS. 15 and 16 illustrate methods for inducting air into an engine of a turbocharged engine system in accordance with different embodiments of the present disclosure.

FIG. 15 illustrates an example method 108 for inducting air into an engine of a turbocharged engine system in one embodiment. The method may be enabled via the configuration shown in FIG. 1, for example, and entered upon in response to a predefined operating condition of the engine system, at regular intervals, and/or whenever the engine system is operating.

Method 108 begins at 110, where engine load is sensed. The engine load may be sensed by interrogating suitable engine system sensors. In some embodiments, a surrogate or predictor of engine load may be sensed. For example, an output of a manifold air pressure sensor may be sensed and used as a predictor of engine load. The method then advances to 112, where it is determined whether the engine load is above an upper threshold. In one embodiment, the upper threshold may correspond to a minimum value of the engine load where LP EGR is desired. If the engine load is above the upper threshold, then the method advances to 114A, where an EGR control valve in the engine system is adjusted such that exhaust gas is directed to an LP mixing point. The method then advances to 116, where a two-way EGR selector valve in the engine system is set to a first state such that the EGR is drawn from an LP take-off point.

However, if it is determined at 112 that the engine load is not above the upper threshold, then method 108 advances to 118, where it is determined whether the engine load is above a lower threshold. If the engine load is above the lower threshold, then the method advances to 114B, where the EGR control valve is adjusted such that exhaust gas is directed to an HP mixing point. The method then advances to 120, where the two-way EGR selector valve is set to a second state such that the EGR is drawn from an HP take-off point.

If it is determined at 118 that the engine load is not above the lower threshold, then method 108 advances to 122, where internal EGR is enabled. The method then advances to 114C, where the EGR control valve is adjusted to shut off external EGR. From 114F, 116 or 120, the method advances to 124, where fuel injection amounts in the engine system are adjusted based on the adjusted EGR flow rates to maintain the desired air-to-fuel ratio. If the engine system comprises a gasoline engine, for example, the desired air-to-fuel ratio may equate to a substantially stoichiometric air-to-fuel ratio.

Figure 16:
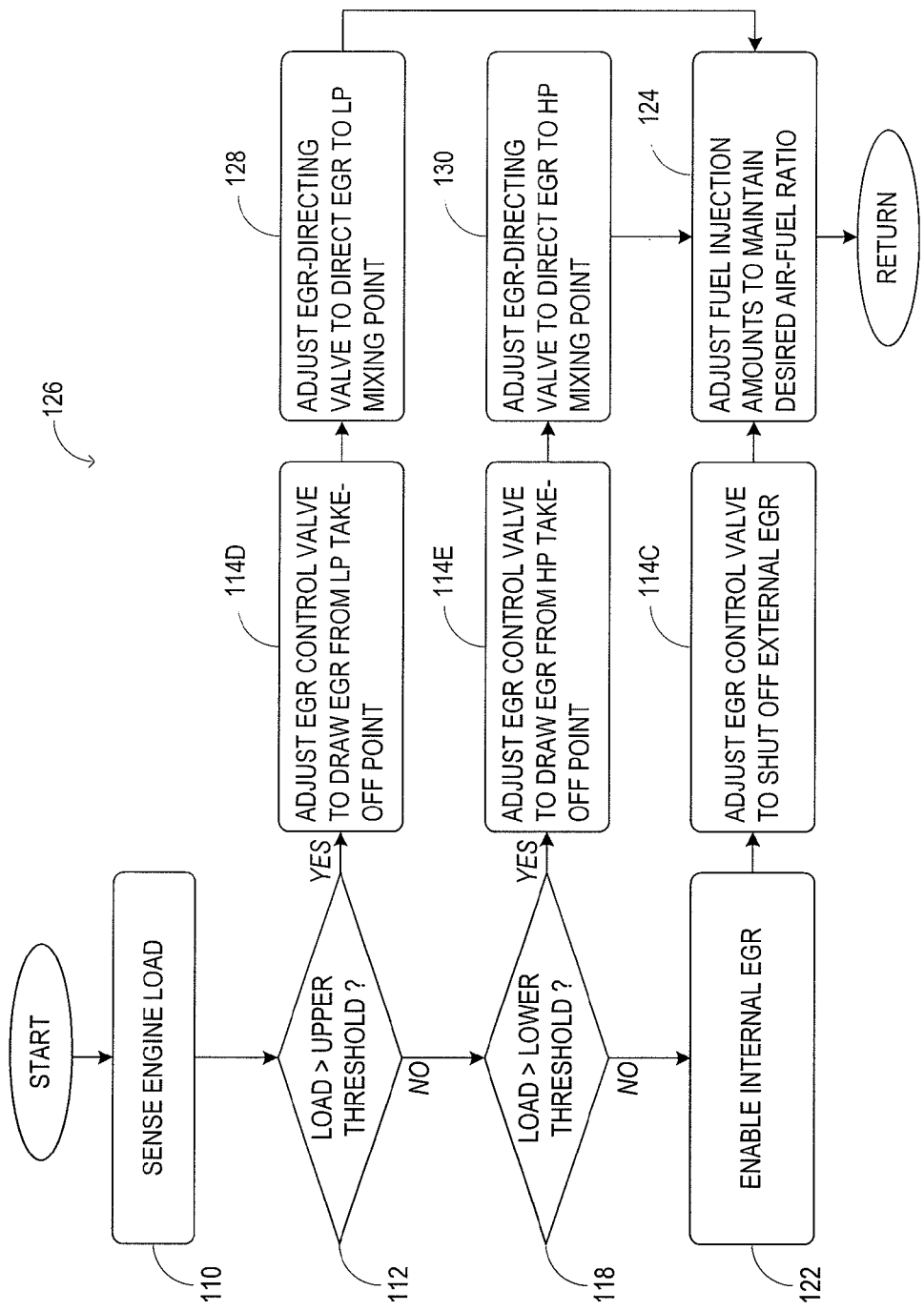

FIG. 16 illustrates an example method 126 for inducting air into an engine of a turbocharged engine system in one embodiment. The method may be enabled via the configuration shown in FIG. 2, for example, and entered upon in response to a predefined operating condition of the engine system, at regular intervals, and/or whenever the engine system is operating.

Method 126 begins at 110, where engine load is sensed. The method then advances to 112, where it is determined whether the engine load is above an upper threshold. If the engine load is above the upper threshold, then the method advances to 114D, where an EGR control valve in the engine system is adjusted such that exhaust gas is drawn from an LP take-off point. The method then advances to 128, where an EGR-directing valve in the engine system is adjusted such that the selected EGR is directed to an LP mixing point.

However, if it is determined at 112 that the engine load is not above the upper threshold, then method 126 advances to 118, where it is determined whether the engine load is above a lower threshold. If the engine load is above the lower threshold, then the method advances to 114E, where the EGR control valve is adjusted such that exhaust gas is drawn from an HP take-off point. The method then advances to 130, where the EGR-directing valve is adjusted such that the selected EGR is directed to an HP mixing point.

If it is determined at 118 that the engine load is not above the lower threshold, then method 126 advances to 122, where internal EGR is enabled. The method then advances to 114C, where the EGR control valve is adjusted to shut off external EGR. From 114C, 128 or 130, the method advances to 124, where fuel injection amounts in the engine system are adjusted based on the adjusted EGR flow rates to maintain the desired air-to-fuel ratio.

No aspect of FIG. 15 or 16 is intended to be limiting, as both methods may comprise numerous other steps and actions not specifically illustrated in the flow charts. For example, the selected EGR flow may be cooled en rote to being diverted to an appropriate HP or LP mixing point. In some embodiments, the EGR flow may be further cooled en route to the mixing point and/or downstream of the mixing point. In one embodiment, different heat exchangers may be used to cool the selected exhaust flow, depending on the position of an EGR-diverting valve or two-way EGR selector valve. In other embodiments, however, the same heat exchanger may be used to cool the selected exhaust flow for both HP and LP EGR loops.

Figure 17:
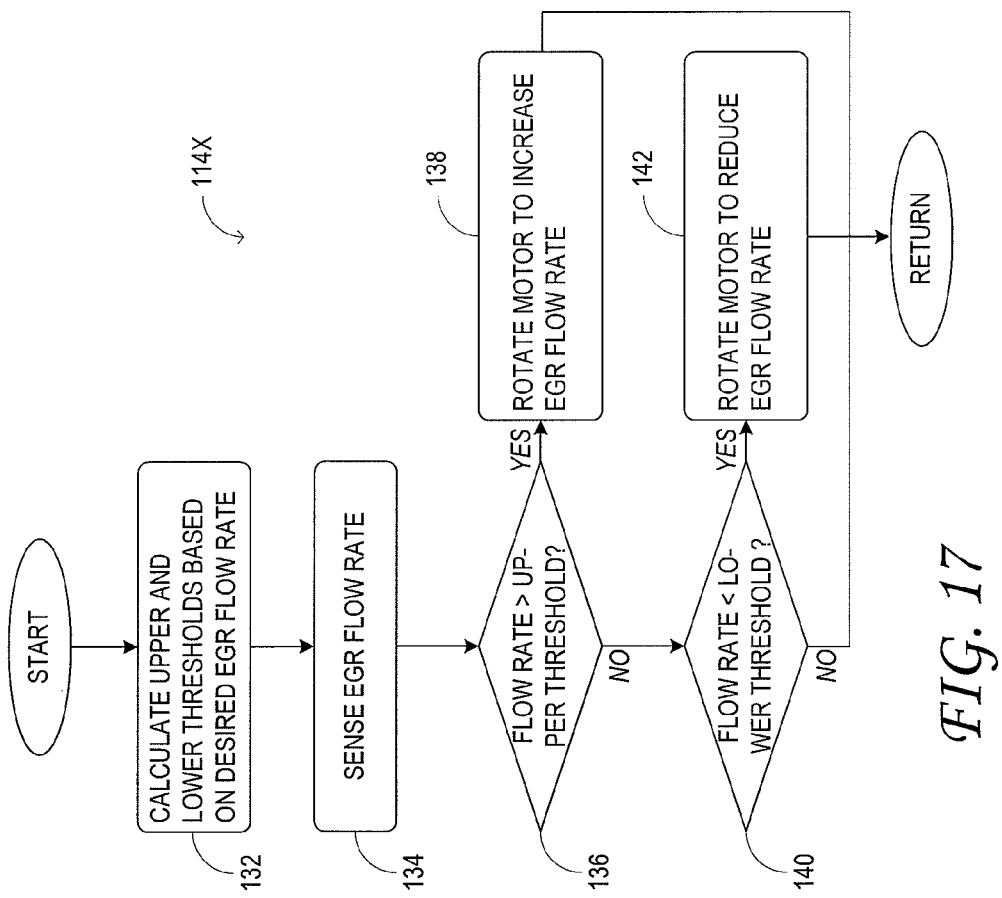
FIG. 17 illustrates a method for actuating an EGR control valve based on the response of an EGR flow sensor in accordance with an embodiment of the present disclosure.

FIG. 17 illustrates an example method 114X for actuating an EGR control valve based on a response of an EGR flow sensor in one embodiment. The method may be entered upon any time an adjustment of an EGR control valve is commanded by an electronic control system of the engine system.

Method 114X begins at 132, where an upper flow-rate threshold and a lower flow-rate threshold are calculated based on a desired EGR flow rate in the engine system. The upper flow-rate threshold may equal the desired EGR flow rate plus a predetermined tolerance value; the lower flow-rate threshold may equal the desired EGR flow rate minus a predetermined tolerance value. In some embodiments, the predetermined tolerance values may be the same for the upper and lower thresholds; in other embodiments, they may be different. Further, the predetermined tolerance values may differ depending on the position of an EGR-directing valve or two-way EGR selector valve in the engine system. For example, the predetermined tolerance values may be chosen so as to provide a tighter flow-rate tolerance when the EGR is admitted to an HP mixing point than when the EGR is admitted to an LP mixing point.

Method 114X then advances to 134, where an EGR flow rate is sensed. The EGR flow rate may be sensed by interrogating any suitable sensor responsive to the EGR flow rate, such as EGR flow sensor 50 of engine systems 10 or 52. In one embodiment, different sensors may be interrogated depending on the position of an EGR-directing valve or two-way EGR selector valve in the engine system. In other embodiments, however, the very same sensor may be interrogated and used to sense EGR flow rate regardless of the position of the EGR-directing valve. In other words, the same sensor may be used to sense HP EGR flow when the HP EGR loop is in use, and, to sense LP EGR flow when the LP EGR loop is in use.

Method 114X then advances to 136, where it is determined whether the EGR flow rate sensed in the previous step is greater than the upper threshold determined previously in the method. If it is determined that the EGR flow rate is greater than the upper threshold, then the method advances to 138, where the motor of an EGR control valve in the engine system is rotated to increase the EGR flow rate. However, if it is determined that the EGR flow rate is not greater than the upper threshold, then the method advances to 140, where it is determined whether the EGR flow rate is less than the lower threshold determined previously in the method. If it is determined that the EGR flow rate is less than the lower threshold, then the motor of the EGR control valve is rotated to reduce the EGR flow rate. Otherwise, or following steps 138 or 142, method 114X returns.

Figure 18:
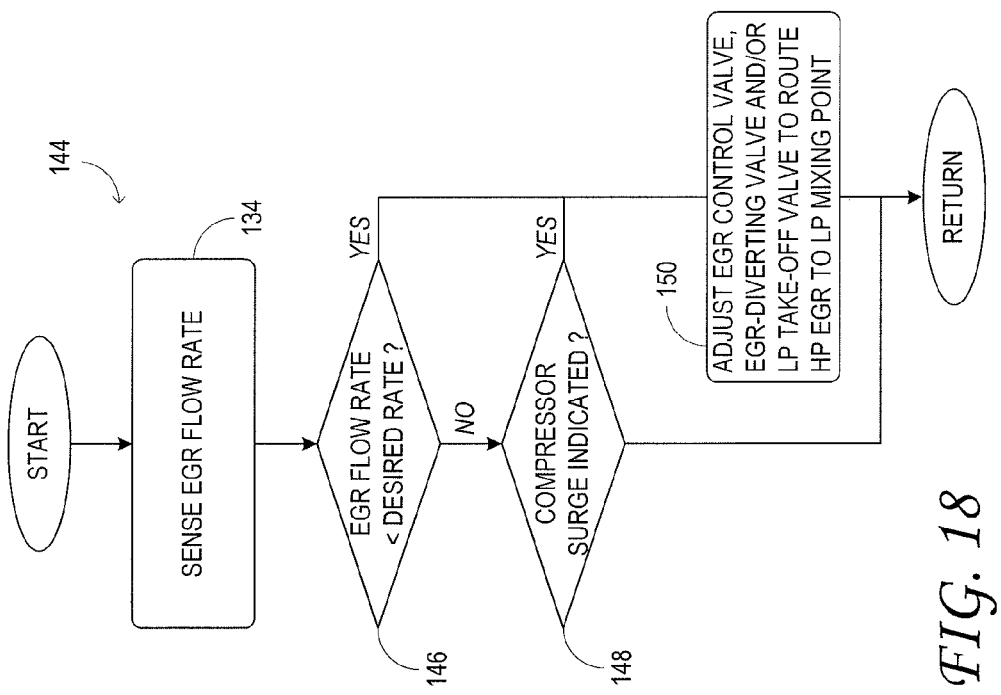
FIG. 18 illustrates another example method for inducting air into an engine of a turbocharged engine system in accordance with an embodiment of the present disclosure.

FIG. 18 illustrates another example method 144 for inducting air into an engine of a turbocharged engine system in one embodiment. The method begins at 134, where the EGR flow rate is sensed, as described previously. The method then advances to 146, where it is determined whether the EGR flow rate in the engine system is less than a desired EGR flow rate. The desired EGR flow rate may be computed based on various engine operating conditions and sensor outputs, including emissions-control sensor outputs. If it is determined that the EGR flow rate is not less than the desired EGR flow rate, then the method advances to 148, where it is determined whether a compressor surge condition is indicated. If it is determined that a compressor surge condition is indicated, whether by detecting an actual compressor surge or by determining that current engine conditions (e.g., air-intake mass flow, manifold air pressure) are predictive of compressor surge, then the method advances to 150. At 150, one or more of an EGR control valve, an EGR-diverting valve, and an LP-take off valve in the engine system are adjusted in order to route exhaust gas from an HP take-off point to an LP mixing point. In one embodiment, the valves can be adjusted so as to route EGR from an HP take-off point upstream of the turbine to an LP mixing point upstream of the compressor. Step 150 of method 144 may also be enacted from 146, when it is determined that the EGR flow rate in the engine system is less than the desired EGR flow rate. Following 150, or when it is determined that a compressor surge condition is not indicated, method 144 returns.

Figure 19:
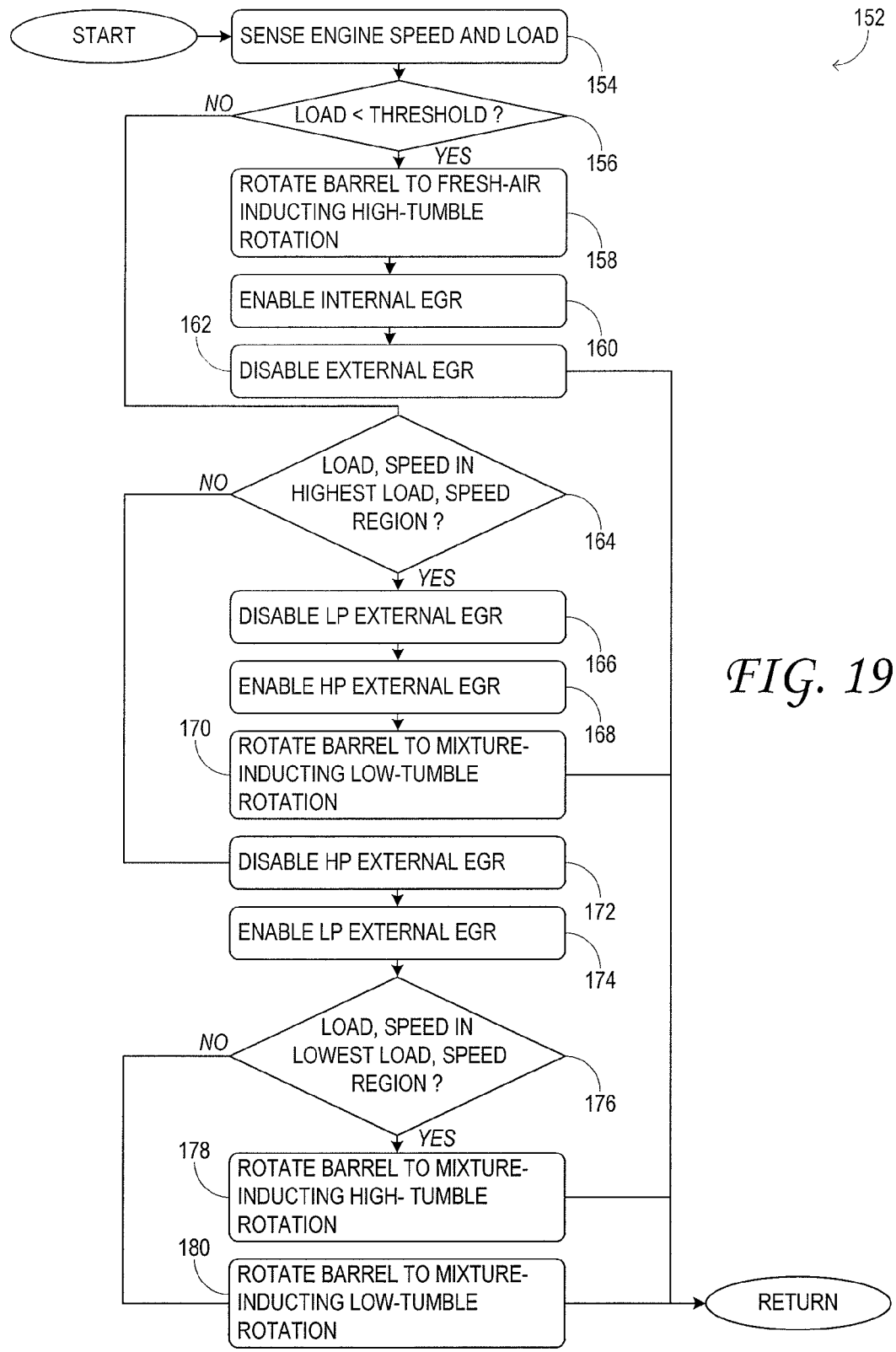
FIG. 19 illustrates a method for routing intake air to a combustion chamber of an engine in accordance with an embodiment of the present disclosure.

FIG. 19 illustrates an example method 152 for routing intake air to a combustion chamber of an engine in one embodiment. In the illustrated method, intake air is drawn from an air cleaner, through an intake port, and delivered to an intake valve coupled at the downstream end of the intake port. To this end, the intake air is inducted through a multifunction throttle valve, which is coupled at the upstream end of the intake port. Structurally, the throttle valve may have some or all of the features ascribed to the forgoing embodiments: the throttle valve may have a rotatable throttle barrel and a barrel bore formed therein; the barrel bore may be configured to selectively couple the upstream end of the intake port to the intake manifold and to the air cleaner; the throttle barrel may be slidably sealed against a partition formed in the intake port, such that the barrel bore communicates selectably with complementary first and second flow areas of the intake port.

Method 152 may admit of various entry conditions. For example, the engine system may be operating when the method is entered upon, and the intake manifold may be filled with a mixture of fresh air and recirculated exhaust. In one embodiment, the mixture may be compressed to above atmospheric pressure, as would be expected for an engine system operating under boosted conditions. In another embodiment, the mixture may be at or near atmospheric pressure, as would occur if a wastegate were opened prior to execution of the method.

Method 152 begins at 154, where the speed and load of the engine are sensed. The speed and load may be sensed by interrogating engine system sensors. In some embodiments, suitable surrogates or predictors of engine speed and/or load may be sensed. For example, an output of a manifold air pressure sensor may be sensed and used as a predictor of engine load. The method then advances to 156, where it is determined whether the engine load is below a threshold. In one embodiment, the threshold may correspond to the horizontal, constant-load line drawn above region 74 of FIG. 5. If the engine load is below the threshold, then the method advances to 158, where the throttle barrel is rotated to a fresh-air inducting, high-tumble rotation, which results in fresh air being supplied upstream of the throttle valve at relatively high tumble. In one embodiment, the fresh-air inducting, high-tumble rotation may be one of a plurality of fresh-air inducting, high-tumble rotations of the throttle valve. Accordingly, the amount of fresh air supplied upstream of the intake valve may be adjusted by rotating the throttle barrel among such rotations. The method then advances to 160, where adjustment of intake and/or exhaust valve timing to promote internal EGR is enabled. Such adjustment may include advancing the closure of one or more exhaust valves and/or retarding the opening of one or more intake valves. The method then advances to 162, where external HP and LP EGR are disabled.

However, if it is determined at 156 that the engine load is not less than the threshold, then method 152 advances to 164, where it is determined whether the operating point of the engine is in the highest speed-load region. In one embodiment, the highest speed-load region may correspond to region 80 of FIG. 5. If the operating point is in the highest speed-load region, then the method advances to 166, where external LP EGR is disabled, and to 168, where external HP EGR is enabled. The method then advances to 170, where the throttle barrel is rotated to a mixture-inducting low-tumble rotation, which results in a mixture of intake air and HP EGR being supplied upstream of the throttle valve at relatively low tumble. In one embodiment, the mixture-inducting, low-tumble rotation may be one of a plurality of mixture-inducting, low-tumble rotations of the throttle valve. Accordingly, the amount of the mixture supplied upstream of the intake valve may be adjusted by rotating the throttle barrel among such rotations. Such adjustment may be responsive to any suitable operating parameter of the engine system. For example, the amount of the mixture may increase as engine load increases and decrease as engine load decreases. Further, various surrogates or predictors of engine load may be used—pedal position, manifold air pressure, etc. In this manner, the throttle barrel may be rotated to supply an increased amount of the mixture upstream of the intake valve during higher engine load conditions, and a decreased amount of the mixture upstream of the intake valve during lower engine load conditions.

However, if it is determined at 164 that the operating point of the engine is not in the highest speed-load region, then method 152 advances to 172, where external HP EGR is disabled, and to 174, where external LP EGR is enabled. The method then advances to 176, where it is determined whether the operating point of the engine is in the lowest speed-load region. In one embodiment, the lowest speed-load region may correspond to region 76 of FIG. 5. If the operating point is in the lowest speed-load region, then the method advances to 178, where the throttle barrel is rotated to a mixture-inducting high-tumble rotation, which results in a mixture of intake air and external LP EGR being supplied upstream of the throttle valve at relatively high tumble. In one embodiment, the mixture-inducting, high-tumble rotation may be one of a plurality of mixture-inducting, high-tumble rotations of the throttle valve. Accordingly, the amount of the mixture supplied upstream of the intake valve may be adjusted by rotating the throttle barrel among such rotations. Such adjustment may be responsive to any suitable operating parameter of the engine system, as noted above.

However, if it is determined at 164 that the operating point of the engine is not in the lowest speed-load region, then the method advances to 180, where the throttle barrel is rotated to a mixture-inducting low-tumble rotation, which results in a mixture of intake air and external LP EGR being supplied upstream of the throttle valve at a relatively low tumble. Thus, method 152 allows adjustment of the degree of tumble in the mixture or in the fresh air supplied upstream of the intake valve. Such adjusting may comprise increasing the degree of tumble during lower engine speed conditions, and decreasing the degree of tumble during higher engine speed conditions. Following the actions taken at 162, 170, 178, or 180, method 152 returns.

Method 152 includes various barrel rotations—at 158, 170, 178, and 180, for example. The barrel rotations are enacted in response to changing operating conditions of the engine system, such as engine speed and/or load. In general, such operating conditions may change gradually or suddenly; accordingly, the illustrated method and the engine systems that enable it are suited to respond to both kinds of change. For example, the barrel-type throttle valve may be configured so that an appropriate response to a TIP-out condition (abruptly decreasing engine load) may comprise less than one quarter turn of the throttle barrel, as noted hereinabove. Such a rotation may be enacted rapidly, causing fresh air from the air cleaner to be inducted into the combustion chambers of the engine, instead of the charged air/EGR mixture that may be present in the intake manifold.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, this disclosure includes all novel and non-obvious combinations and sub-combinations of the various systems and methods disclosed herein, as well as any and all equivalents thereof.

The invention claimed is:
1. An engine system comprising:
an air cleaner;
a combustion chamber coupled to an intake port of a cylinder of an engine;
an intake manifold configured to receive air from the air cleaner, and, under some conditions, to receive exhaust from the combustion chamber; and
a multifunction, barrel-type throttle valve having a first inlet, a second inlet, and an outlet, the first inlet coupled to the intake manifold, the second inlet coupled to the air cleaner, and the outlet coupled to the intake port.
2. The engine system of claim 1, further comprising a valve actuator mechanically coupled to the throttle valve and an electronic control system operatively coupled to the valve actuator, wherein the electronic control system is configured to control flow from the first and second inlets to the outlet by commanding rotation of the valve actuator, wherein the intake port comprises an intake conduit, and wherein the combustion chamber comprises an intake valve coupled to the intake conduit and an exhaust valve coupled to an exhaust manifold.

3. The engine system of claim 2, wherein the intake conduit comprises a partition configured to segregate a first flow area of the intake conduit from a second flow area of the intake conduit and to guide each segregated flow to the intake valve, and wherein the electronic control system is further configured to control whether the outlet communicates with one or both of the first and second flow areas by commanding rotation of the valve actuator.

4. The engine system of claim 3, wherein the throttle valve comprises a rotatable throttle barrel and a barrel bore formed therein, the barrel bore configured to couple an upstream end of the intake conduit to the intake manifold at a first rotation of the throttle barrel, and to couple the upstream end of the intake conduit to the air cleaner at a second rotation of the throttle barrel, the throttle barrel slidably sealed against the partition such that the barrel bore communicates with the first flow area at a third rotation of the throttle barrel and with the first and second flow areas at a fourth rotation of the throttle barrel.

5. The engine system of claim 2, wherein at least one of the intake valve and the exhaust valve are configured to open and close according to an adjustable timing, and wherein the adjustable timing is controlled by the electronic control system to regulate an amount of exhaust present in the combustion chamber at a time of ignition.

6. The engine system of claim 1, further comprising an exhaust-gas recirculation cooler, wherein the exhaust received into the intake manifold is drawn through the exhaust-gas recirculation cooler.

7. The engine system of claim 1, wherein the intake manifold is coupled downstream of a compressor.

8. The engine system of claim 7, wherein the compressor is mechanically coupled to an exhaust-driven turbine.

9. The engine system of claim 8, further comprising an exhaust-gas recirculation conduit configured to transport the exhaust to a locus upstream of the compressor from a locus downstream of the turbine.

10. A multifunction throttle valve for an intake port of an engine, the intake port having an upstream end and a downstream end, the downstream end fluidically coupled to a combustion chamber of the engine via an intake valve, the throttle valve comprising:
  a throttle body having an outlet configured to couple to the upstream end of the intake port, a first inlet configured to couple to a first air source, and a second inlet configured to couple to a second air source;
  a throttle barrel rotatably coupled into the throttle body and having a barrel bore, the barrel bore aligning with the first inlet at a first rotation of the throttle barrel, with the second inlet at a second rotation of the throttle barrel, and with the outlet at the first and second rotations of the throttle barrel; and
  a partition formed in the outlet, extending across the outlet, and dividing the outlet into complementary first and second zones, the partition slidably sealed against the throttle barrel such that the barrel bore aligns with the first zone at a third rotation of the throttle barrel and with the first and second zones at a fourth rotation of the throttle barrel, the partition configured to segregate flow through the first zone from flow through the second zone and to guide each segregated flow to the intake valve.

11. The throttle valve of claim 10, wherein the first air source is an intake manifold of the engine, and the second air source is an air cleaner.

12. The throttle valve of claim 10, wherein the first, second, third, and fourth rotations of the throttle barrel are among a plurality of substantially continuous rotations of the throttle barrel within the throttle body.

13. A method for routing intake air to a combustion chamber of an engine, the intake air drawn from an air cleaner, through an intake conduit, and delivered to an intake valve at a downstream end of the intake conduit, the method comprising:
  inducting the intake air through a multifunction throttle valve coupled to an upstream end of the intake conduit, the throttle valve having a rotatable throttle barrel and a barrel bore formed therein, the barrel bore selectively coupling the upstream end of the intake conduit to an intake manifold and to the air cleaner, the throttle barrel slidably sealed against a partition formed in the intake conduit, such that the barrel bore communicates selectably with complementary first and second flow areas of the intake conduit;
  filling the intake manifold with a mixture of fresh air and recirculated exhaust;
  during a first operating condition, rotating the throttle barrel to a first rotation to supply the mixture upstream of the intake valve;
  during a second operating condition, rotating the throttle barrel to a second rotation to supply only fresh air upstream of the intake valve.

14. The method of claim 13, further comprising, during the first operating condition, rotating the throttle barrel to adjust an amount of the mixture supplied upstream of the intake valve, and during the second operating condition, rotating the throttle barrel to adjust an amount of fresh air supplied upstream of the intake valve.

15. The method of claim 13, further comprising rotating the throttle valve to adjust a degree of tumble in the mixture or in the fresh air supplied upstream of the intake valve.

16. The method of claim 15, wherein said adjusting comprises increasing the degree of tumble during lower engine speed conditions, and decreasing the degree of tumble during higher engine speed conditions.

17. The method of claim 15, wherein rotating the throttle valve to adjust the degree of tumble comprises: during a third operating condition, rotating the throttle barrel to a third rotation to supply the mixture to just one of the first and second flow areas; during a fourth operating condition, rotating the throttle barrel to a fourth rotation to supply the mixture to both the first and second flow areas; and during a fifth operating condition, rotating the throttle barrel to a fifth rotation to supply fresh air to just one of the first and second flow areas.

18. The method of claim 13, wherein the first and second rotations are separated by less than one quarter turn of the throttle barrel.

19. The method of claim 13, further comprising rotating the throttle barrel from the first rotation to the second rotation during tip-out conditions.

20. The method of claim 13, further comprising rotating the throttle barrel to supply an increased amount of the mixture upstream of the intake valve during higher engine load conditions, and a decreased amount of the mixture upstream of the intake valve during lower engine load conditions.

* * * * *